UNITED STATES PATENT OFFICE 1,952,849

MIXED FERTILIZER

Carl Eyer and Friedrich Korn, Ludwigshafen-on-the-Rhine, Germany, assignors to I. G. Farbenindustrie Aktiengesellschaft, Frankfort-on-the-Main, Germany No Drawing. Application May 18, 1932, Serial No. 612,153. In Germany May 27, 1931

11 Claims. (Cl. 71—9)

The present invention relates to improvements in mixed fertilizers containing ammonium nitrate which are stable when stored.

In order to prevent the conglomeration and caking of fertilizers it has already been proposed, inter alia, to incorporate therewith salts, as for example magnesium salts, which are capable of taking up water in the form of water of crystallization. When these salts are mixed with the fertilizers in the dry state, however, there is a danger that the components may subsequently separate out from the mixture. This drawback may be lessened or obviated by incorporating the additional substances with the melts of the fertilizers, as for example of ammonium sulphate nitrate. Since, however, the conglomeration or caking of the fertilizers, such as ammonium sulphate nitrate, takes place mainly on the surface of the granules of the material, it is preferable to coat the same with the additional substances because then the latter are present in a particularly high concentration at the most endangered places, i. e. on the surface. Products of this kind may be prepared by spraying the fused additional substances on the finished fertilizers, such as ammonium sulphate nitrate, in the manner already proposed, for example, in the case of calcium nitrate. There is, however, the drawback that the salts usually employed for the said purpose have very high melting points which renders the process impracticable in some cases, or that many salts cannot be fused at all without special precautions. The employment of aqueous solutions of salts for the spraying renders a subsequent drying of the whole fertilizer necessary because the fertilizer is unfavourably influenced by water as regards the stability when stored.

We have now found that all the said drawbacks are obviated and that mixed fertilizers containing ammonium nitrate, in particular ammonium sulphate nitrate, or mixed fertilizers from potassium chloride and ammonium nitrate, or those from ammonium nitrate, diammonium phosphate and potassium chloride, having excellent properties as regards storage are obtained by applying to the granules of the mixed fertilizers not single salts but fused mixtures of magnesium nitrate with one or more alkali metal nitrates (throughout this specification and the appended claims the term alkali metal nitrate is meant to include ammonium nitrate) with or without one or more alkaline earth metal nitrates and/or urea. Preferably use is made of eutectic mixtures of the said salts, because these have particularly low melting points. Thus, for example, an eutectic mixture of 2 parts of calcium nitrate, 54 parts of magnesium nitrate and 44 parts of sodium nitrate melts to form a completely water-white fused product at 138° C. while calcium nitrate and sodium nitrate have melting points of 561° C. and 308° C., respectively, and while magnesium nitrate cannot be directly obtained in a liquid anhydrous state at all. The properties of many others of the said mixtures are similar, a few being given in the following examples.

The protective melts are sprayed onto the fertilizers to be protected while the latter are kept in agitation. For example, when the fertilizers are prepared by mixing the ingredients in a conveyor worm, the melts are sprayed onto the fertilizers after the latter begin to crumble. Or the finished fertilizers are allowed to fall freely in a closed chamber, the melt being sprayed onto the granules during their fall.

The following examples will further illustrate the nature of this invention but the invention is not restricted to these examples. The parts are by weight.

*Example 1*

93.5 kilograms of magnesium nitrate,

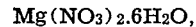

$Mg(NO_3)_2.6H_2O$, 44 kilograms of sodium nitrate, $NaNO_3$, and 2.9 kilograms of calcium nitrate, $Ca(NO_3)_2.4H_2O$, are fused together and evaporated. The anhydrous mixture of salts melts at about 138° C. By spraying the melt onto 1000 kilograms of ammonium sulphate nitrate, a fertilizer which is very stable when stored is obtained which exhibits scarcely any hardening phenomena even when stored under very unfavourable conditions.

If instead of spraying the melt onto the ammonium sulphate nitrate it would be incorporated therewith during the preparation of the ammonium sulphate nitrate, a salt would be obtained which becomes about three times as hard as the salt sprayed according to the first paragraph of this example when stored under identical conditions and for the same time.

*Example 2*

16.9 kilograms of magnesium nitrate,

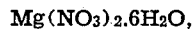

$Mg(NO_3)_2.6H_2O$, are melted together with 5.25 kilograms of potassium nitrate, $KNO_3$. 35 kilograms of a melt of equal parts of ammonium nitrate and urea are added to the water-clear melt obtained. The salt mixture thus obtained melts far below 100° C.

and is sprayed onto dry ammonium sulphate nitrate as described in the preceding example.

*Example 3*

50 kilograms of an anhydrous melt consisting of 65 parts of anhydrous magnesium nitrate and 35 parts of potassium nitrate are sprayed in the manner described above onto 1000 kilograms of a mixed fertilizer prepared from potassium chloride and ammonium nitrate. An excellently stable product is obtained.

*Example 4*

91.5 parts of ammonium nitrate containing 8 per cent of water are mixed in a conveyor worm with 100 parts of diammonium phosphate and 103 parts of potassium chloride. When the initially pasty mass has solidified to dry granules, it is sprayed with 11 parts of an anhydrous melt consisting of 5.7 parts of anhydrous magnesium nitrate and 5.3 parts of sodium nitrate. A complete fertilizer stable in storage and immediately ready for being strewn is obtained.

What we claim is:

1. The process of producing a mixed fertilizer containing ammonium nitrate which is stable when stored, which comprises applying to the granules of the mixed fertilizer a fused mixture comprising magnesium nitrate and an alkali metal nitrate, and solidifying said mixture on said granules.

2. The process of producing a mixed fertilizer containing ammonium nitrate which is stable when stored, which comprises applying to the granules of the mixed fertilizer a fused mixture comprising magnesium nitrate, an alkali metal nitrate and a substance selected from the group consisting of the alkaline earth metal nitrates and urea, and solidifying said mixture on said granules.

3. A mixed fertilizer containing ammonium nitrate which is stable when stored, the granules of which have a solidified superficial coating of a fused mixture comprising magnesium nitrate and an alkali metal nitrate.

4. A mixed fertilizer containing ammonium nitrate which is stable when stored, the granules of which have a solidified superficial coating of a fused mixture comprising magnesium nitrate, an alkali metal nitrate and a substance selected from the group consisting of the alkaline earth metal nitrates and urea.

5. Ammonium sulphate nitrate which is stable when stored, the granules of which have a solidified superficial coating of a fused mixture comprising magnesium nitrate and an alkali metal nitrate.

6. Ammonium sulphate nitrate which is stable when stored, the granules of which have a solidified superficial coating of a fused mixture comprising magnesium nitrate, an alkali metal nitrate and a substance selected from the group consisting of the alkaline earth metal nitrates and urea.

7. Ammonium sulphate nitrate which is stable when stored, the granules of which have a solidified superficial coating of a fused mixture comprising magnesium nitrate, potassium nitrate, ammonium nitrate and urea.

8. A mixed fertilizer substantially composed of ammonium nitrate and potassium chloride which is stable when stored, the granules of which have a solidified superficial coating of a fused mixture comprising magnesium nitrate and an alkali metal nitrate.

9. A mixed fertilizer substantially composed of ammonium nitrate and potassium chloride which is stable when stored, the granules of which have a solidified superficial coating of a fused mixture comprising magnesium nitrate and potassium nitrate.

10. A mixed fertilizer substantially composed of ammonium nitrate, diammonium phosphate and potassium chloride which is stable when stored, the granules of which have a solidified superficial coating of a fused mixture comprising magnesium nitrate and an alkali metal nitrate.

11. A mixed fertilizer substantially composed of ammonium nitrate, diammonium phosphate and potassium chloride which is stable when stored, the granules of which have a solidified superficial coating of a fused mixture comprising magnesium nitrate and sodium nitrate.

CARL EYER.
FRIEDRICH KORN.